United States Patent
Siegel

(10) Patent No.: US 7,236,123 B2
(45) Date of Patent: Jun. 26, 2007

(54) SYSTEM FOR ENHANCED DETECTION OF A TARGET

(75) Inventor: Alan Siegel, Rockville, MD (US)

(73) Assignees: American Systems Corporation, Chantilly, VA (US); Systems Planning Corporation, Arlington, VA (US)

( * ) Notice: Subject to any disclaimer, the term of this patent is extended or adjusted under 35 U.S.C. 154(b) by 143 days.

(21) Appl. No.: 10/977,708

(22) Filed: Oct. 29, 2004

(65) Prior Publication Data

US 2006/0049978 A1 Mar. 9, 2006

Related U.S. Application Data

(60) Provisional application No. 60/607,122, filed on Sep. 3, 2004.

(51) Int. Cl.
*G01S 13/534* (2006.01)
(52) U.S. Cl. .................... 342/159; 342/113; 342/194; 342/195
(58) Field of Classification Search ................ 342/159
See application file for complete search history.

(56) References Cited

U.S. PATENT DOCUMENTS

| | | | | |
|---|---|---|---|---|
| 3,972,041 A * | 7/1976 | Howard | ...................... | 342/89 |
| 3,987,442 A * | 10/1976 | McLeod, Jr. | ................. | 342/162 |
| 4,132,990 A * | 1/1979 | Di Domizio et al. | ......... | 342/89 |
| 4,137,533 A * | 1/1979 | Briechle et al. | ............ | 342/162 |
| 4,635,060 A * | 1/1987 | Mertens | ...................... | 342/194 |
| 4,768,035 A * | 8/1988 | Thurber et al. | ............. | 342/194 |
| 5,177,487 A * | 1/1993 | Taylor et al. | ............... | 342/159 |
| 6,466,157 B1 * | 10/2002 | Bjornholt et al. | ............. | 342/28 |
| 2004/0046689 A1 * | 3/2004 | Rees et al. | .................. | 342/159 |

* cited by examiner

*Primary Examiner*—Thomas H. Tarcza
*Assistant Examiner*—Matthew M. Barker
(74) *Attorney, Agent, or Firm*—Chernow Katz, LLC

(57) ABSTRACT

Disclosed herein is a computer-readable medium having stored thereon computer-executable instructions for providing phase-range data associated with a return pulse of a radar device and second phase-range data associated with a successive return pulse of the radar device. The computer-executable instructions are preferably also for comparing the phase-range data and the second phase-range data to obtain a difference, and for differentiating the difference. In some embodiments of the invention, the computer-executable instructions are preferably also for discriminating a target from clutter by using the differentiated difference to identify coordinates satisfying a velocity threshold associated with the clutter. Embodiments of the invention preferably enable phase-coherent operation of a non-coherent radar device by processing backscattered clutter return, and in some aspects, do so using clutter distributed in range as a reference. Related systems, methods, devices, and other embodiments are also disclosed herein.

45 Claims, 12 Drawing Sheets

SYSTEM FOR ENHANCED DETECTION OF A TARGET

CROSS-REFERENCE TO RELATED APPLICATIONS

The current application claims the benefit under 35 U.S.C. § 119(e) of U.S. provisional patent application 60/607,122 filed on Sep. 3, 2004, which is hereby incorporated by reference in its entirety for all purposes.

BACKGROUND OF THE INVENTION

1. Field of Invention

The invention disclosed herein relates generally to a system, method and device for enhanced detection of a target. More specifically, preferred embodiments of the disclosed invention relate to an enhanced detection system, method and device to discriminate a target from clutter using an existing non-coherent radar device.

2. Description of the Related Art

Known magnetron-based radar devices use the amplitude information associated with an echo or return pulse in an attempt to detect a target. While amplitude-based detection is suitable for some circumstance, it is not preferable for all circumstances particularly when the target is small, when there is a large amount of clutter relative to the target strength, or both.

Phase-based detection generally provides enhanced levels of target detection allowing for easier recognition of a target from surrounding clutter. The prior art includes phase-based detection radar systems, referred to as coherent radar systems (and include coherent-on-receive systems), which provide enhanced levels of target detection based on the phase information associated with the return pulse. However, the coherence of these prior art systems is largely attributable to hardware techniques in which the received phase is directly or indirectly related to the phase of the transmitter or some other host-radar reference. The cost of many of these coherent radar systems can range from four to eight million dollars, while the cost of non-coherent magnetron-based radar system can run as little as five thousand dollars. The magnitude of the cost differential is due, at least in part, to the use of costly transmitter/receiver technologies that are used to obtain phase coherence. There is a need for a low-cost alternative to achieving coherence that provides enhanced target detection.

Prior art embodiments of coherent radar devices include, for example, fully-coherent radar devices and coherent-on-receive radar devices. Known embodiments of fully-coherent radar device include transmit and receive oscillators that are in a fixed-phase relationship with one another. The transmitter and receiver of these embodiments either share an oscillator or use two separate oscillators locked to the same source. By contrast, known embodiments of coherent-on-receive devices use a substantially stable reference oscillator to correct phase differences at the receiver, based on phase differences from the transmitter. Fully-coherent radar devices and coherent-on-receive devices are both examples of a coherent radar device.

Known techniques used to achieve coherence of a simple, magnetron-based, non-coherent radar device require that the hardware of the radar device be modified. Invasive hardware modifications, including the addition of components and signal paths, may be cost-prohibitive. There are no known examples of a system for non-invasive modifications that provide coherence of return pulses received by a non-coherent radar device. However, there is a need for a device that can be coupled to a magnetron-based or other non-coherent radar device to enhance detection of a target and techniques for achieving coherence. Overcoming the disadvantages present in the prior art, various embodiments of the invention comprise a system, device and/or method for cohering the intermediate frequency signal of a radar device for enhancing levels of target detection.

SUMMARY OF THE INVENTION

Preferred embodiments of the enhanced detection device include a mixer, a coherent oscillator, an analog-to-digital (A/D) converter, a digital signal processor (DSP), a central processing unit (CPU) and a display. Preferred embodiments of the enhanced detection device also include an input device for controlling the central processing unit, digital signal processor and/or other components. The enhanced detection device may be coupled to an existing radar device and, in some embodiments, the enhanced detection device may itself comprise an integrated radar device.

The mixer is for receiving an intermediate frequency (IF) signal in an analog format from the radar device. The intermediate frequency signal contains information obtained from the return pulse received from a target. The intermediate frequency signal often further includes signal components associated with clutter and/or noise. The coherent oscillator preferably generates a coherent signal, which is then mixed with the intermediate frequency signal at the mixer. The mixer preferably sends an in-phase (I) signal and a quadrature (Q) signal in an analog format to the analog-to-digital converter for conversion of the analog format into digital format.

The digital signal processor preferably receives the in-phase signal and the quadrature signal from the analog-to-digital converter. Phase data as a function of range, referenced herein as phase-range data, and amplitude data as a function of range, referenced herein as amplitude-range data, are calculated from the in-phase signal and the quadrature signal. In preferred embodiments, the digital signal processor also receives trigger data and azimuth angle data from the radar device. The central processing unit is preferably used to enhance detection of the target, using phase-range data, as well as trigger data and azimuth angle data. In some embodiments, the processor also uses amplitude-range data to enhance detection of the target. A display is preferably used for showing the enhanced detection of the target.

Also disclosed herein is a system for enhanced detection of a target. Embodiments of the preferred system include a computer-readable medium having computer-executable instructions for performing a method. The preferred method, referred to as an enhanced detection method, includes: (1) receiving phase-range data for a return pulse associated with a target; (2) receiving amplitude-range data for the return pulse; and (3) receiving second phase-range data for a second return pulse associated with the target. The phase-range data and the second phase-range data are preferably compared to obtain a change in phase or phase delta, herein referenced as a "difference." The use of numbering nomenclature herein, such as "(1)", "(2)" and "(3)" above, are used for the purposes of clarity and do not require that steps in the method be implemented in a specific order or require that the method lacks intermediate steps.

Continuing with a description of the preferred method, a subset of range samples is created from that amplitude-range data which satisfies an amplitude threshold. An amplitude mask is built from the subset and then is applied to the difference to create what is referenced herein as a "masked difference." The masked difference is then differentiated with respect to range to obtain what is herein referenced as a "differentiated masked difference" or a "derivative of the masked difference." The target is preferably detected by identifying coordinates of the differentiated masked difference that satisfy a velocity threshold. In preferred embodiments, the enhanced detection method checks the envelope of the amplitude-range data and a target is identified when detected by the velocity threshold and/or the envelope check.

Preferred embodiments of the invention include a computer-readable medium having stored thereon computer-executable instructions for performing the following method. The computer-executable instructions are preferably for providing phase-range data associated with a return pulse of a radar device and second phase-range data associated with a successive return pulse of the radar device. In some aspects, providing phase-range data and second phase-range data includes providing an array of phase data as a function of range data and a second array of second phase data as a function of second range data. The return pulse may be associated with one of a plurality of radar devices. Preferred embodiments of the computer-readable medium include computer-executable instructions for extracting the phase-range data and second phase-range data from an in-phase signal and a quadrature signal taken from an intermediate frequency signal of a radar device.

The computer-executable instructions are preferably also for discriminating a target from clutter by using the differentiated difference to identify coordinates satisfying a velocity threshold associated with the clutter. In some embodiments, said discriminating may include discriminating the target from the clutter by using the differentiated difference to identify coordinates associated with a velocity exceeding clutter velocity. In some embodiments, said discriminating includes identifying clutter behavior and filtering-out coordinates of the differentiated difference associated with the clutter behavior. Identifying clutter behavior preferably includes identifying an anomalous change of velocity and/or identifying an anomalous change of amplitude. In some embodiments of the invention, an anomaly, such as an anomalous change of velocity, is determined within the bounds of statistical observations typical of the prevailing clutter scene. The filtering-out process preferably includes identifying a contact with consistent velocity that persists for a period of time exceeding the maximum duration of typical clutter events with similar velocity and filtering-out other contacts.

Preferred embodiments of the invention include a computer-readable medium having stored thereon computer-executable instructions for performing the following method: (1) providing phase-range data associated with a return pulse of a radar device, second phase-range data associated with a successive return pulse of the radar device, and amplitude-range data associated with at least one of the return pulse and the successive return pulse; (2) comparing the phase-range data and the second phase-range data to obtain a difference; (3) creating a subset of coordinates from the amplitude-range data that satisfy an amplitude threshold associated with the clutter; (4) building an amplitude mask from the subset; (5) applying the amplitude mask to the difference; (6) differentiating the masked difference; and (7) discriminating a target from clutter by identifying coordinates from the differentiated masked difference satisfying a velocity threshold associated with the clutter.

Preferred embodiments of the invention include a system for discrimination of a target from clutter. The system preferably comprises a computer-readable medium having stored thereon computer-executable instructions for performing a method and at least one computing device for executing the computer-executable instructions stored on the computer-readable medium. Suitable computing devices are known in the art and may include the central processing unit.

Some embodiments of the system include means for non-invasively acquiring an intermediate frequency signal of the radar device and means for downconversion of the intermediate frequency signal to an in-phase signal and a quadrature signal. Preferred embodiments of the means for non-invasively acquiring the intermediate frequency signal include an IF data line for non-invasively tapping a radar device. Preferred embodiments of the means for downconversion include a coherent oscillator for generating a coherent oscillator signal and a mixer for mixing the intermediate frequency signal and the coherent oscillator signal.

Some embodiments of the system include the radar device, which is preferably a non-coherent radar device. Some embodiments of the system include a display for showing the discriminated target substantially free of clutter. The target preferably includes at least a portion of a watercraft and may include a submarine periscope. In some embodiments of the system, the target comprises a human, a land vehicle, or both. The clutter preferably comprises at least one of terrain clutter, rain clutter, and discrete clutter, and more preferably comprises sea clutter. Some embodiments of the system are substantially free of a coherent radar device.

Embodiments of the present invention include a method for discrimination of a target from clutter. The method for discrimination of a target from clutter preferably includes providing phase-range data associated with a return pulse of a radar device, second phase-range data associated with a successive return pulse of the radar device, and amplitude-range data associated with at least one of the return pulse and the successive return pulse. The method preferably also includes: (1) comparing the phase-range data and the second phase-range data to obtain a difference; (2) creating a subset of coordinates from the amplitude-range data that satisfy an amplitude threshold associated with the clutter; (3) building an amplitude mask from the subset; (4) applying the amplitude mask to the difference; (5) differentiating the masked difference; and (6) discriminating the target from the clutter by identifying coordinates from the differentiated masked difference satisfying a velocity threshold associated with the clutter.

The method for discrimination of a target from clutter preferably also includes deriving the phase-range data, the second phase-range data and the amplitude-range data from an in-phase signal and a quadrature signal associated with an intermediate frequency signal of a radar device. In some aspects, the method includes downconverting the intermediate frequency signal with a coherent oscillator signal to produce the in-phase signal and the quadrature signal. Downconverting preferably includes downconverting to produce the in-phase signal and quadrature signal in an analog format for conversion into a digital format.

In some embodiments of the method for discrimination of a target from clutter, the method includes non-invasively acquiring the intermediate frequency signal from the radar device, preferably a non-coherent radar device. In some aspects, the method includes extracting the phase-range data, second phase-range data and amplitude-range data from the in-phase signal and quadrature signal. Some embodiments of the method include showing the discriminated target substantially free of clutter.

In preferred embodiments of the method, discrimination includes using the differentiated masked difference to identify coordinates associated with a velocity exceeding clutter velocity. In some aspects of the invention, discrimination includes: (1) identifying clutter behavior; and (2) filtering-out coordinates of the differentiated mask difference associated with the clutter behavior. The identification of clutter behavior preferably includes identifying an anomalous change of velocity and/or an anomalous change of amplitude. In some embodiments of the invention, an anomaly, such as an anomalous change of velocity, is determined within the bounds of statistical observations typical of the prevailing clutter scene. Identifying coordinates unassociated with clutter behavior preferably includes identifying a contact with consistent velocity that persists for a period of time exceeding the maximum duration of typical clutter events with similar velocity.

Preferred embodiments of the invention also include a method for discrimination of a target from clutter using an intermediate frequency signal of a non-coherent radar device. The method preferably includes: (1) acquiring the intermediate frequency signal from the non-coherent radar device; (2) manipulating the intermediate frequency signal to provide phase-range data associated with a return pulse of the non-coherent radar device and second phase-range data associated with a successive return pulse of the non-coherent radar device; and (3) comparing the phase-range data and the second phase-range data to obtain a difference.

The method for discrimination of a target from clutter using the intermediate frequency signal of the non-coherent radar device preferably further includes identifying at least one disturbance in a slope of the difference satisfying a threshold, and identification may include the use of a linear regression technique and/or a wavelet transform. Preferred embodiments of the method for discrimination of a target from clutter using the intermediate frequency signal of the non-coherent radar device also include differentiating the difference and identifying at least one disturbance in a slope of the differentiated difference satisfying a velocity threshold. The intermediate frequency signal is preferably also manipulated to provide amplitude-range data associated with at least one of the return pulse and the successive return pulse.

Additional embodiments of the method for discrimination of a target from clutter using the intermediate frequency signal of the non-coherent radar device include: (1) building an amplitude mask from at least a portion of the amplitude-range data; (2) applying the amplitude mask to the difference; (3) differentiating the masked difference; and (4) identifying at least one disturbance in a slope of the differentiated masked difference satisfying a velocity threshold. In some embodiments, the method includes showing coordinates of the at least one disturbance in the slope that satisfy the velocity threshold. In some embodiments, the method includes creating a subset of coordinates from the amplitude-range data that satisfy an amplitude threshold. The amplitude mask is preferably built from the subset.

Preferred embodiments of the invention also include a radar system having a radar device that comprises a non-coherent transmitter section for generating and transmitting first and second pulsed RF oscillatory signals, and a receiver section for detecting first and second return signals. The radar system preferably also includes: (1) means for acquiring an intermediate frequency signal from the radar device, such as an IF data line connected to a suitable tap point of the radar device; (2) means for downconverting the intermediate frequency signal to produce an in-phase signal in an analog format and quadrature signal in an analog format, such as a mixer and coherent oscillator; (3) means for converting the analog format of the in-phase signal and the analog format of the quadrature signal into digital formats, such as an A-D converter; and (4) means for using the in-phase signal and quadrature signal to discriminate a target from clutter by identifying a disturbance in a phase difference between phase-range data associated with the first return signal and second phase-range data associated with the second return signal, such as the digital signal processor and the central processing unit. Preferred embodiments of the radar system include a means for showing the discriminated target. In some aspects, the radar device may be used to show the discriminated target. Some embodiments of the radar system are substantially free of a coherent radar device.

Preferred embodiments of the invention include a method for substantial removal of relative phase variations from a radar device with a non-coherent transmitter section. The method preferably includes: (1) non-invasively acquiring an intermediate frequency signal from the radar device; (2) downconverting the intermediate frequency signal with a coherent oscillator signal to produce an in-phase signal in an analog format and a quadrature signal in an analog format; (3) converting the analog format of the in-phase signal and the analog format of the quadrature signal into digital formats; (4) using the in-phase signal and quadrature signal to provide phase-range data associated with a return pulse of the radar device, second phase-range data associated with a successive return pulse of the radar device, and amplitude-range data associated with at least one of the return pulse and the successive return pulse; (5) comparing the phase-range data and the second phase-range data to obtain a difference; (6) creating a subset of coordinates from the amplitude-range data that satisfy an amplitude threshold associated with the clutter; (7) building an amplitude mask from the subset; (8) applying the amplitude mask to the difference; and (9) differentiating the masked difference. In preferred embodiments of the invention, the differentiated masked difference is is the phase difference drift rate for the non-coherent transmitter section and receiver section of the radar device.

Preferred embodiments of the invention also include a method of non-invasively cohering a non-coherent radar device. The method preferably includes the following: (1) acquiring an intermediate frequency signal from the non-coherent radar device; (2) manipulating the intermediate frequency signal to provide phase-range data associated with a return pulse of the non-coherent radar device and second phase-range data associated with a successive return pulse of the non-coherent radar device; and (3) comparing the phase-range data and the second phase-range data to obtain a difference. Manipulating preferably includes manipulating the intermediate frequency signal to provide amplitude-range data associated with at least one of the return pulse and the successive return pulse. Some embodiments of the method further include differentiating the difference.

The method of non-invasively cohering a non-coherent radar device preferably also includes building an amplitude mask from at least a portion of the amplitude-range data and applying the amplitude mask to the difference. Preferred embodiments of the method preferably include creating a subset of coordinates from the amplitude-range data that satisfy an amplitude threshold, and wherein building comprises building the amplitude mask from the subset. Some embodiments of the method of non-invasively cohering a non-coherent radar device include differentiating the masked difference.

Preferred embodiments of the invention include an enhanced detection system, including the following: (1) a coherent oscillator for generating a coherent oscillator signal; (2) a mixer for mixing the coherent oscillator signal and an intermediate frequency signal of a non-coherent radar device to downconvert the intermediate frequency signal to an in-phase signal and a quadrature signal in an analog format; (3) an analog-to-digital converter for converting the analog format of the in-phase signal and quadrature signal into a digital format; (4) a digital signal processor for using the in-phase signal and quadrature signal in the digital format to provide phase-range data of a return pulse of the non-coherent radar device and second phase-range data of a successive return pulse of the non-coherent radar device; (5) a computing device that compares the phase-range data and the second phase-range data to obtain a difference, differentiates the difference, and discriminates a target from clutter by using the differentiated difference to identify coordinates satisfying a velocity threshold associated with the clutter; and (6) a display for showing the discriminated target substantially free of clutter. Some embodiments of the enhanced detection system include the non-coherent radar device.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings:

FIG. 12a is a graph showing a trace of the derivative of the ΔP function of FIG. 11a;

DETAILED DESCRIPTION OF THE INVENTION

Figure 1:
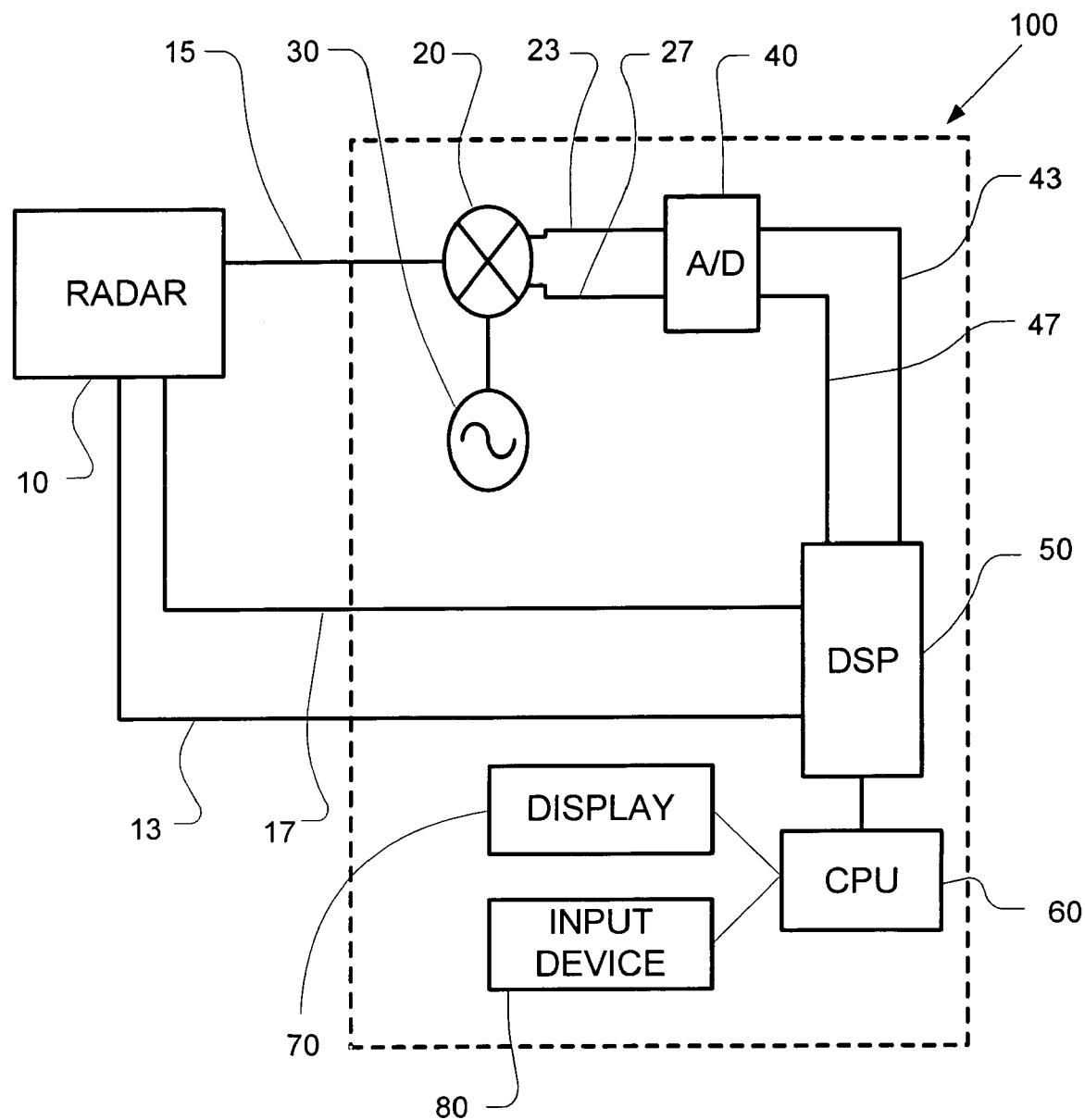
FIG. 1 is a block diagram showing a radar device coupled with a preferred embodiment of an enhanced detection device.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With principal reference to FIG. 1, an enhanced detection system is designated generally 100 and shown coupled to a radar device 10. In preferred embodiments, enhanced detection system 100 comprises a mixer 20, a coherent oscillator 30, an analog-to-digital converter 40, a digital signal processor 50, a central processing unit 60, a display 70, and an input device 80.

Enhanced detection system 100 is suitable for cohering non-coherent radar devices, such as a magnetron-based radar device; however, embodiments of enhanced detection system 100 may also be suitable for enhancing the performance of radar devices already having high levels of coherence. Radar device 10 preferably comprises a navigation or surveillance radar device that is interfaced to enhanced detection system 100 via an IF data line 15, a trigger data line 13, and an azimuth angle data line 17. IF data line 15 preferably comprises a coaxial RF cable; however, any suitable signal medium can be utilized. IF data line 15 passes the intermediate frequency signal from radar device 10 to mixer 20. In preferred embodiments of enhanced detection system 100, the intermediate frequency signal is non-invasively extracted from an appropriate tap point on radar device 10 such that normal operation of radar device 10 is undisturbed. The intermediate frequency signal that is passed to IF data line 15 is representative, at least in part, of target and clutter information received by radar device 10 on a return pulse.

Mixer 20 is also in electrical communication with coherent oscillator 30 to permit downconversion of the intermediate frequency signal. Mixer 20 outputs an in-phase signal in an analog format and a quadrature signal in an analog format, which preferably comprise I and Q video signals. These in-phase and quadrature signals are passed along cables or other signal mediums, herein referenced as analog I-line 23 and analog Q-line 27, to analog-to-digital converter 40. The chosen frequency output of coherent oscillator 30 is preferably matched with the intermediate frequency signal and the chosen analog-to-digital converter 40 to optimize performance. Analog-to-digital converter 40 digitizes the analog formats of the in-phase signal and quadrature signal.

Known embodiments of coherent radar devices (including fully-coherent radar devices and coherent-on-receive devices) use a signal source, such as a local oscillator, to serve as the phase reference to establish and maintain coherence of the return signal. Coherent oscillator 30 is preferably used for downconversion of the intermediate frequency signal to the in-phase signal and the quadrature signal at a frequency suitable for conversion by analog-to-digital converter 40. Preferred embodiments of the invention do not require that coherent oscillator 30 serve as a phase reference.

Preferred systems include a computing device, such as one including digital signal processor 50 and central processing unit 60 and a computer-readable medium. Digital signal processor 50 receives the in-phase signal and quadrature signal from analog-to-digital converter 40 via digital I-line 43 and digital Q-line 47. Digital signal processor 50 receives azimuth angle data passed via azimuth angle data line 17 from radar device 10 and receives trigger data via trigger data line 13 from radar device 10. Digital signal processor 50 utilizes the trigger data for timing and the azimuth angle data for proper showing of the target on a display.

Data from digital signal processor 50 is then passed via a signal medium to a processor, such as central processing unit 60, where target detection and discrimination occur. A computer-readable medium preferably includes computer-executable instructions stored therein for central processing unit 60 or other computing device to implement the method of the computer-executable instructions. A preferred enhanced detection method minimizes clutter interference originally present on the return pulse and sends enhanced target data to display 70 allowing viewing of targets that may have originally been obscured by clutter. The preferred enhanced detection method will be discussed below in further detail with principal reference to FIG. 7 and FIG. 16.

Continuing with principal reference to FIG. 1, enhanced target data is sent to display 70 via a signal medium for substantially clutter-free viewing of the target. In preferred embodiments, display 70 uses a graphical user interface (GUI). Enhanced detection system 100 also includes at least one input device 80, such as a mouse, keyboard or other suitable input device known in the art. In this respect, input device 80 can be used to control operations of digital signal processor 50, central processing unit 60, both, and/or other components.

Figure 2:
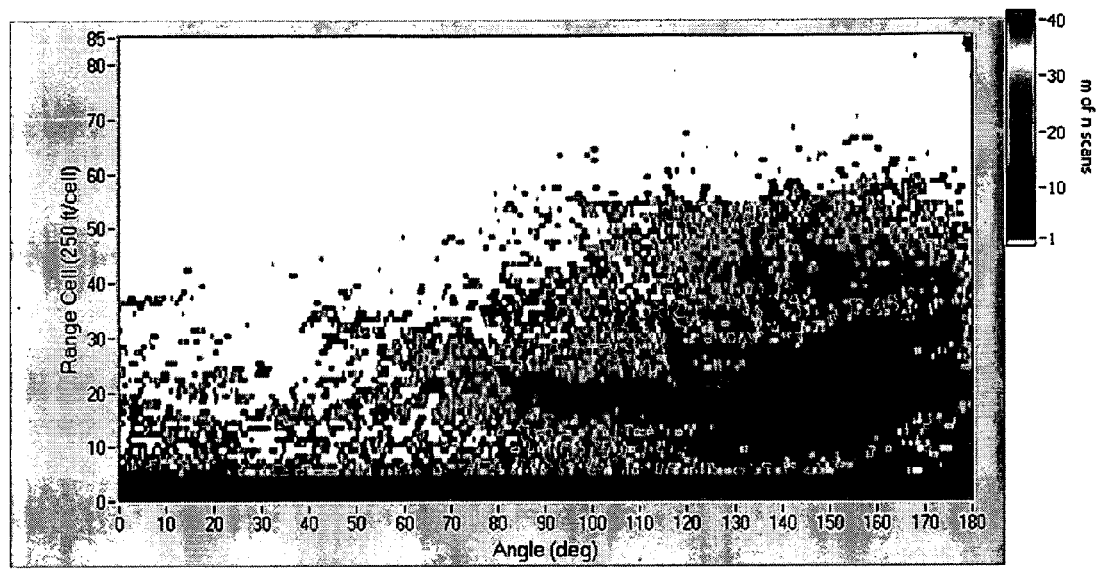
FIG. 2 is a screenshot of a display showing clutter obscuring a target.
Figure 3:
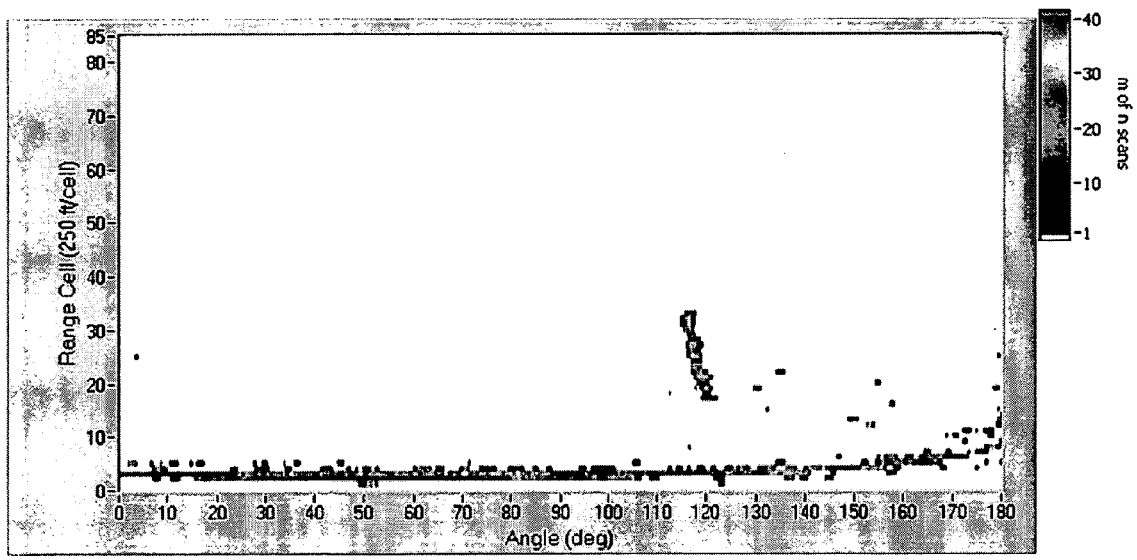
FIG. 3 is a screenshot of a display showing enhanced detection of the target of FIG. 2.

With principal reference to FIGS. 2 and 3, enhanced detection system 100 substantially enhances the accuracy in which the return pulse data is displayed. Enhancement detection system 100 removes clutter, revealing a clear target distinguished from clutter. For example, the results of testing against collected data are shown in FIG. 2, where the sample target, a thirty-foot scarab, is obscured by clutter. Thus, although the target may be detected by a radar device, such as radar device 10, the simultaneous display of detected clutter obscures the display of the detected target. However, as shown in FIG. 3, enhanced detection system 100 produces enhanced target data revealing the target, which is no longer obscured by clutter.

Figure 4:
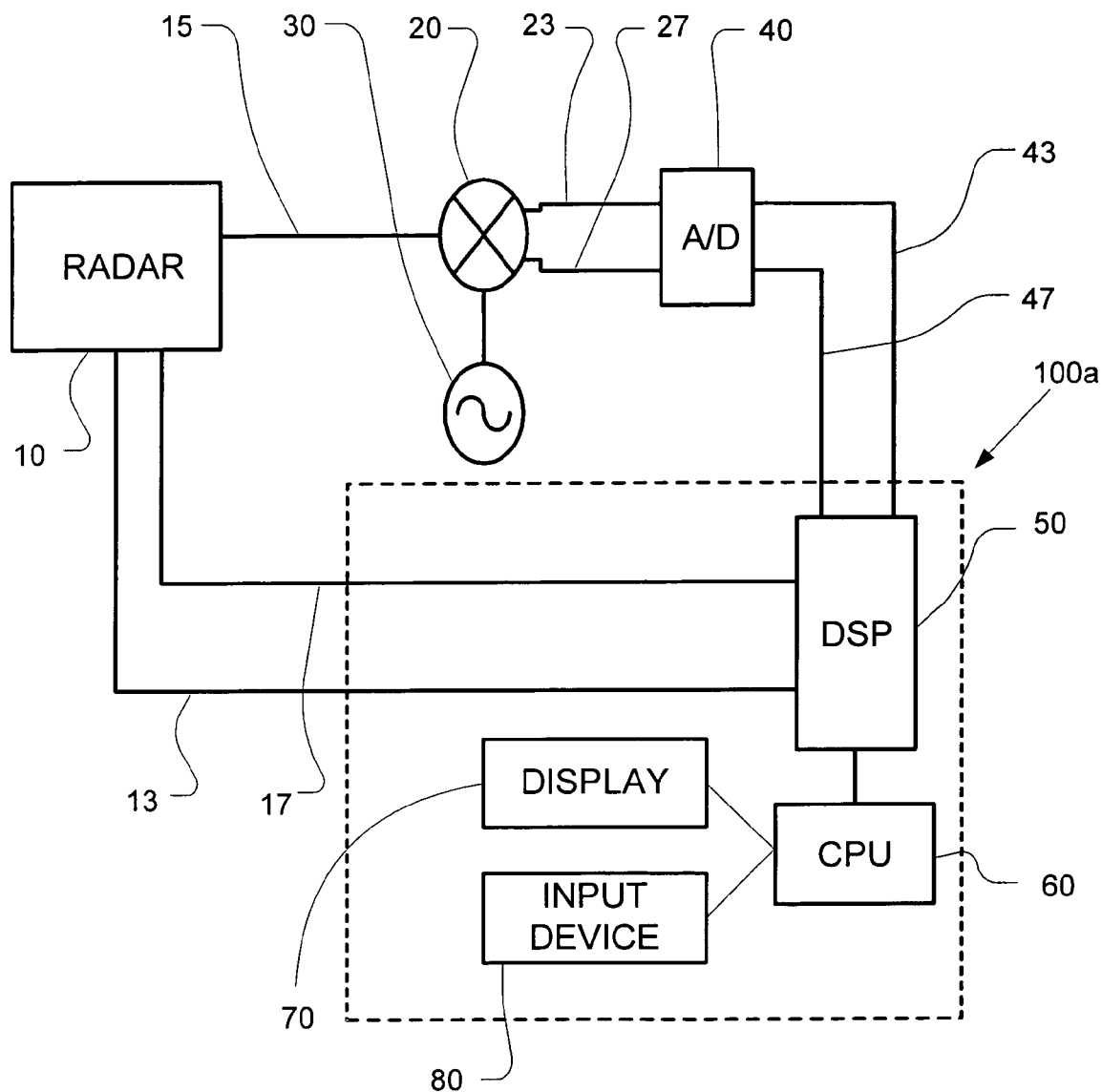
FIG. 4 is a block diagram showing another preferred embodiment of the enhanced detection device shown in FIG. 1.
Figure 5:
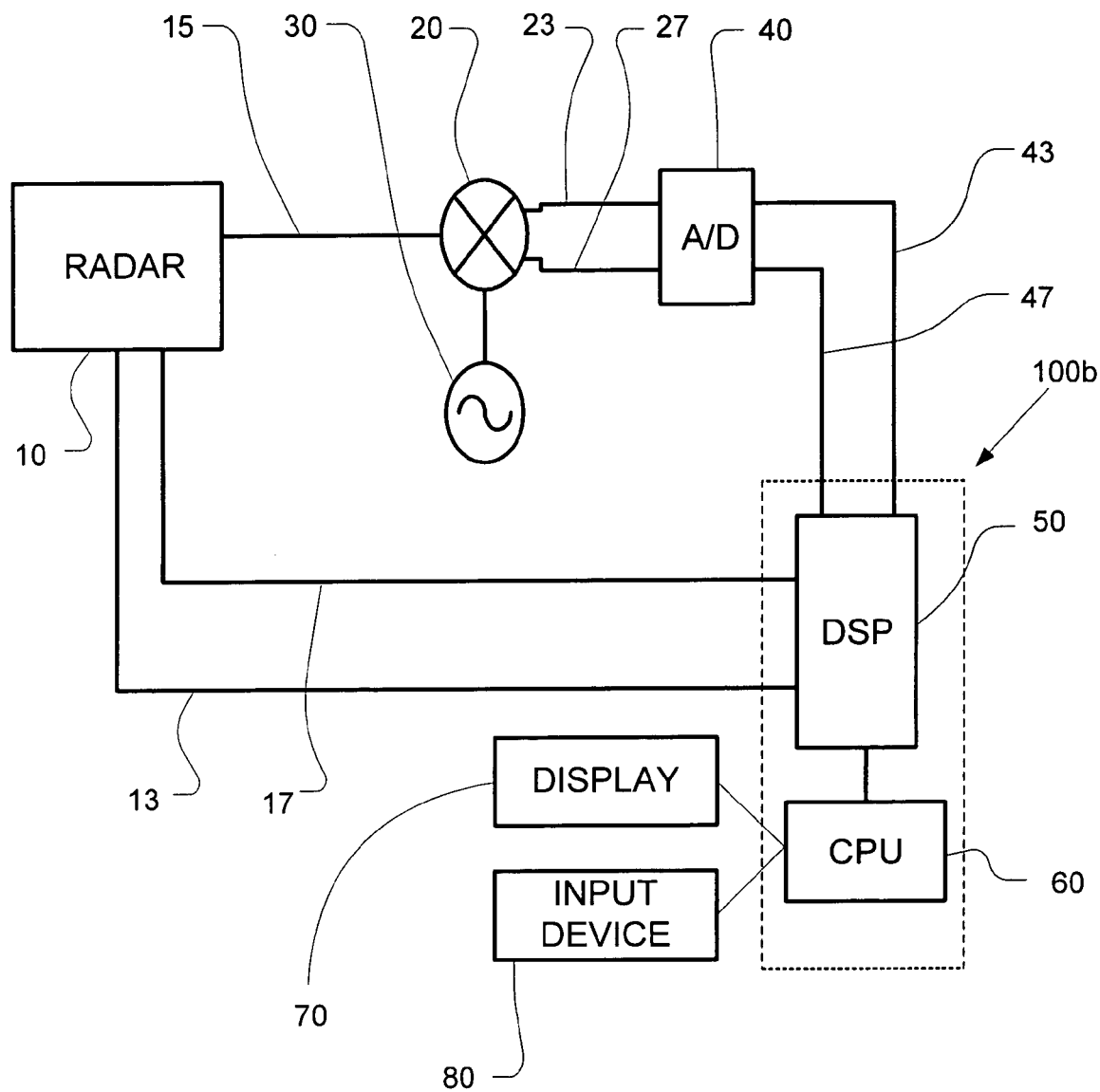
FIG. 5 is a block diagram showing another preferred embodiment of the enhanced detection device shown in FIG. 1.
Figure 6:
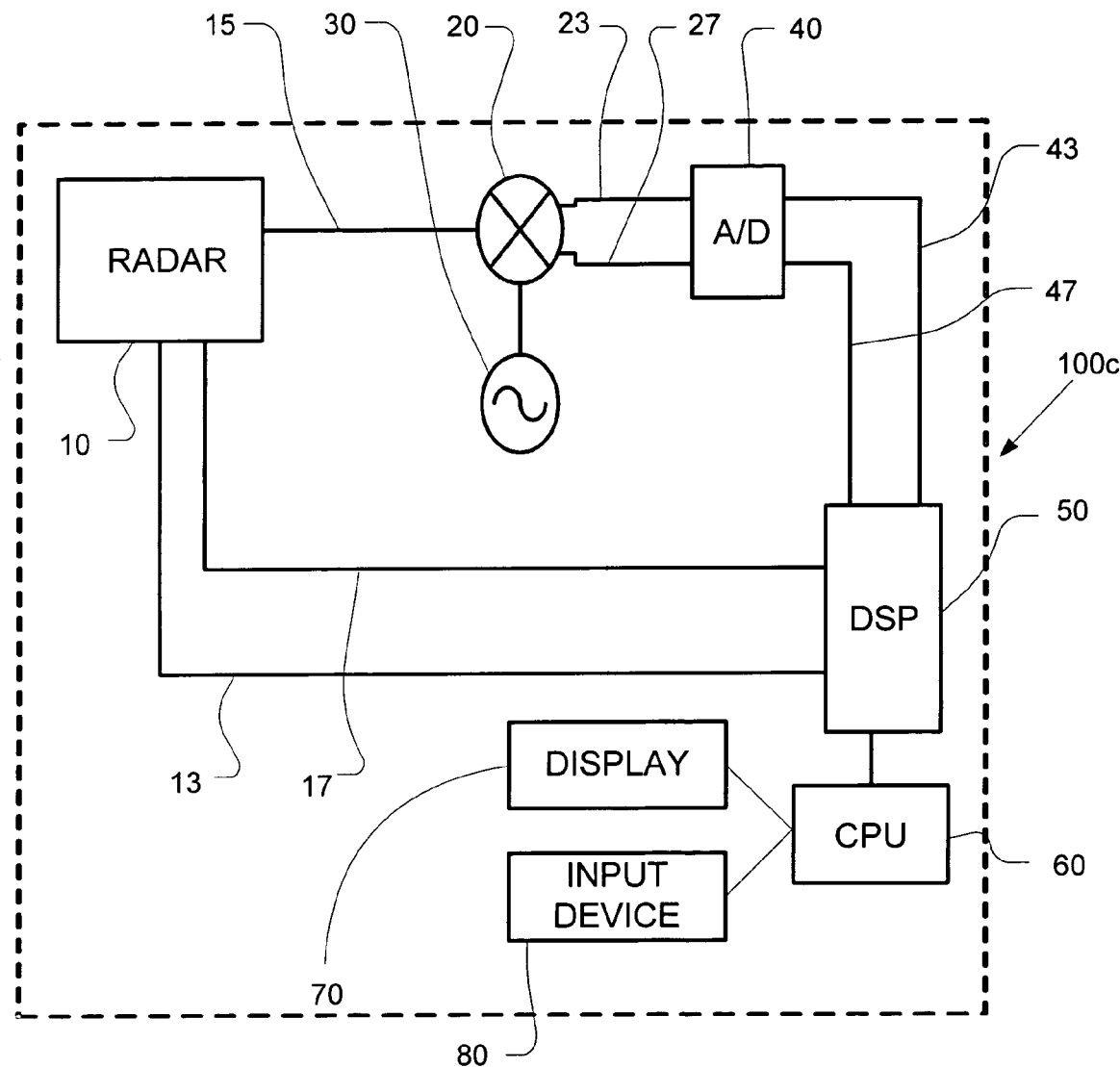
FIG. 6 is a block diagram showing another preferred embodiment of the enhanced detection device shown in FIG. 1.

With principal reference to FIGS. 4 through 6, some embodiments of enhanced detection system 100 comprise fewer or more components than the embodiment shown in FIG. 1. For example, as shown in FIG. 4, enhanced detection system 100a is shown to include digital signal processor 50, central processing unit 60, display 70, and input device 80. As shown, enhanced detection system 100a is coupled to radar device 10, mixer 20, coherent oscillator 30, and analog-to-digital converter 40; however, enhanced detection system 100a can also be connected directly to a radar device having a digital output that transmits the in-phase signal and quadrature signal or the phase-range data and amplitude-range data of a return pulse. FIG. 5 shows another embodiment of enhanced detection system 100b, which comprises digital signal processing unit 50 and central processing unit 60.

As another example, FIG. 6 shows another embodiment of enhanced detection system 100c, which includes radar device 10, itself being an integrated component of enhanced detection system 100c. Notably, while FIG. 6 shows that radar device 10 is a separate component from display 70, radar device 10 may comprise display 70 such that the enhanced target data may be shown directly on the screen of radar device 10. Additional embodiments of enhanced detection system 100 are contemplated and the various components of enhanced detection system 100 may be distributed in any number and manner of combination. Enhanced detection system 100 may also be linked to a communications network (not shown) for remote review and analysis of all data. It is contemplated that embodiments of enhancement detection system 100 are operable with various commercial embodiments of radar device 10 and are thus interchangeable between the various embodiments of radar device 10. In this respect, enhanced detection system 100 may be characterized as being modular.

With principal reference to FIG. 7, a preferred embodiment of the enhanced detection method implemented by enhanced detection system 100 is designated generally as 200 and will now be discussed in further detail. Radar device 10 is used more effectively for discriminating targets from clutter when enhanced detection method 200 is used. Said clutter may result from the environment of the target, such as the sea (or other body of water) or the surrounding terrain. Unless indicated herein to the contrary, the steps and substeps of enhanced detection method 200 may be implemented in any logical order. Furthermore, in some embodiments of enhanced detection method 200, multiple steps may occur substantially simultaneously (e.g. parallel processing). In some embodiments of enhanced detection method 200, steps may share portions of computer code. Some embodiments of enhanced detection method 200 do not require all of the steps shown in FIG. 7.

At mixing step 205, mixer 20 mixes the intermediate frequency signal from radar device 10 and the signal from coherent oscillator 30 to output signals carrying amplitude and phase information, which preferably include an in-phase signal in analog format and a quadrature signal in an analog format. At conversion step 210, the analog formats are digitized by analog-to-digital converter 40 and the in-phase signal and quadrature signals are sent in digital format to digital signal processor 50 and central processing unit 60 for discrimination and detection.

The in-phase signal and the quadrature signal may be converted to a phase signal and an amplitude signal. The process may operate either on the in-phase signal and the quadrature signal or on the phase signal and the amplitude signal. However, for the purpose of clarity of disclosure, it is easier to describe the preferred method in terms of a phase signal and an amplitude signal. The phase signal contains phase-range data, referenced herein as PRD, and the phase signal contains PRD associated with at least one return pulse $P_i$. PRD $P_i$ preferably comprises an array of phase data as a function of range data $[r_i, \Phi(r_i)]$ associated with the return pulse $P_i$. The amplitude signal contains amplitude-range data, referenced herein as ARD, and the amplitude signal contains ARD preferably associated with the same return pulse $P_i$. ARD $P_i$ preferably comprises an array of amplitude data as a function of range data $[r_i, A(r_i)]$ associated with the return pulse $P_i$.

The preferred enhanced detection method 200 can be described from the perspective of two branches of an "OR" operation that occurs at identification step 255. One side of the OR operation of identification step 255 preferably includes envelope detection step 215, while the other side of the OR operation occurs between delay step 220 and velocity threshold step 250, inclusively. The OR operation of identification step 255, along with all other suitable steps in the various embodiments of enhanced detection method 200, may be accomplished by using hardwired logic, programmable logic, software, or any combination thereof.

Figure 8:
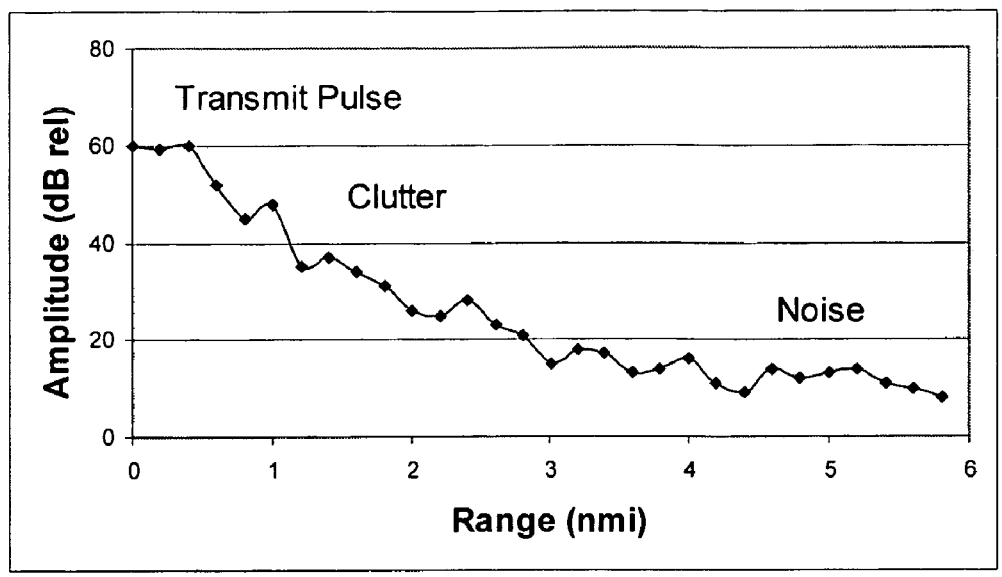
FIG. 8 is a graph showing a sample embodiment of the relative amplitudes of a pulse, clutter and noise.

One of the two sides of the OR operation of identification step 255 preferably includes envelope detection step 215, which attempts detection of the target by using ARD $P_i$. Some embodiments of enhanced detection method 200 include this threshold stage to detect large targets with standard envelope-detection logic. However, envelope-detection is plagued by an undesirable margin of error, particularly for small targets, because it may be difficult to discern the target from the clutter and/or noise. A sample quantitative comparison between these amplitudes is shown in FIG. 8. For circumstances where the target could easily be detected by studying the envelope of the return pulse, envelope detection step 215 acts as a prophylactic measure designed to identify a target that is not identified, for whatever reason, by the phase-based detection on the other side of the OR logic of identification step 255. Some embodiments of enhanced detection method 200 do not require envelope detection step 215.

Figure 7:
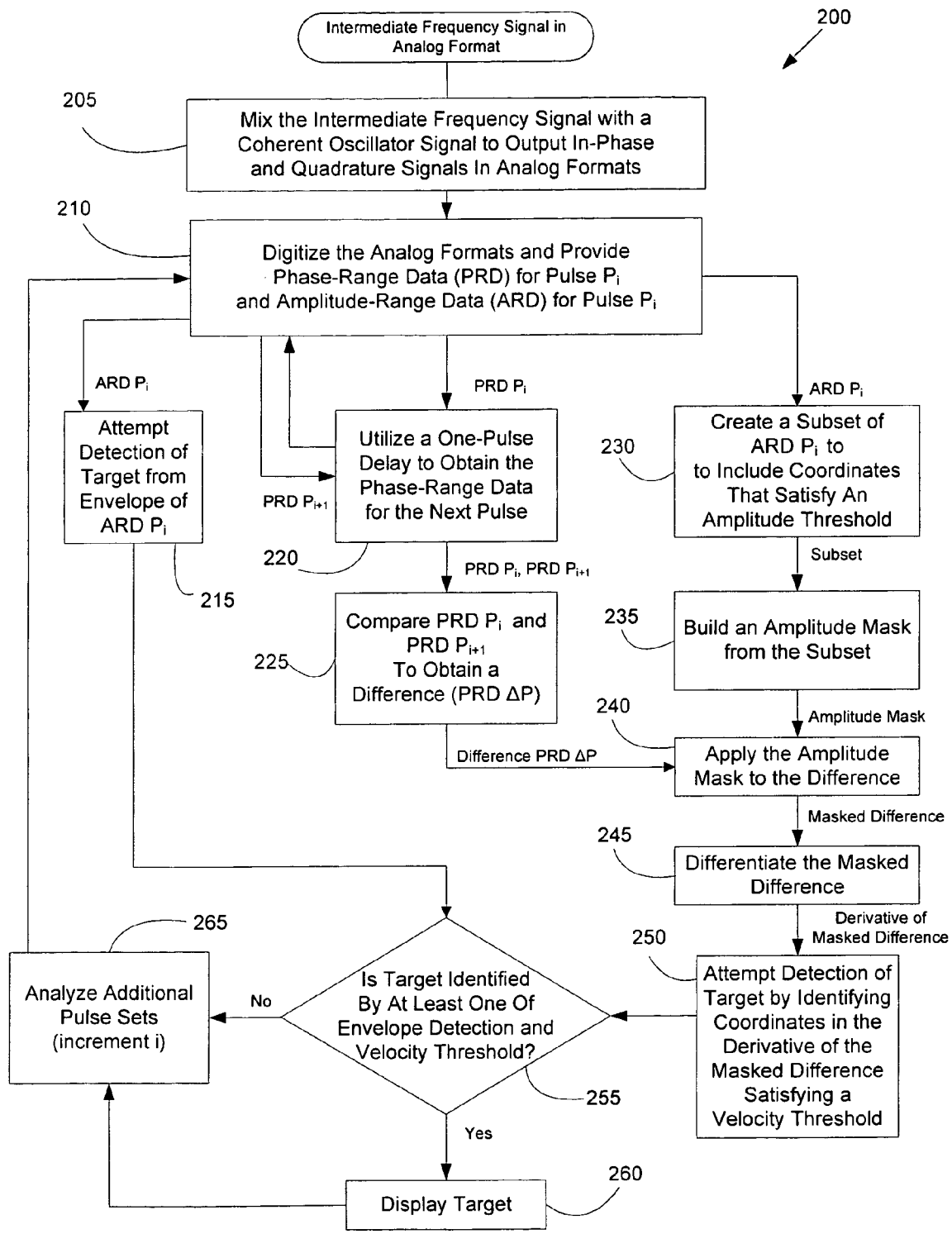
FIG. 7 is a flow chart showing a preferred embodiment of an enhanced detection method implemented by the enhanced detection device of FIG. 1.

Continuing with principal reference to FIG. 7, the other side of the OR operation of identification step 255 is preferably a phase-based detection method that includes delay step 220, comparison step 225, subset step 230, mask building step 235, masking step 240, differentiating step 245, and velocity threshold step 250. Delay step 220 and comparison step 225 prepare the phase-based information to be masked at masking step 240, while subset step 230 and mask building step 235 use amplitude-based information to prepare the mask that is applied at masking step 240.

Figure 9:
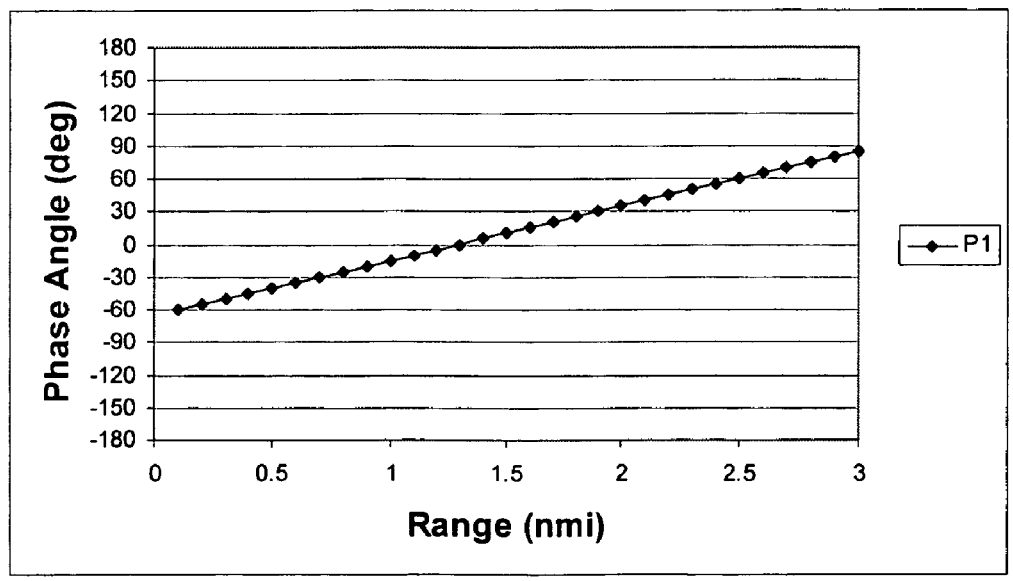
FIG. 9 is a graph showing a trace of the phase of a first sample pulse with respect to range (P1)
Figure 10:
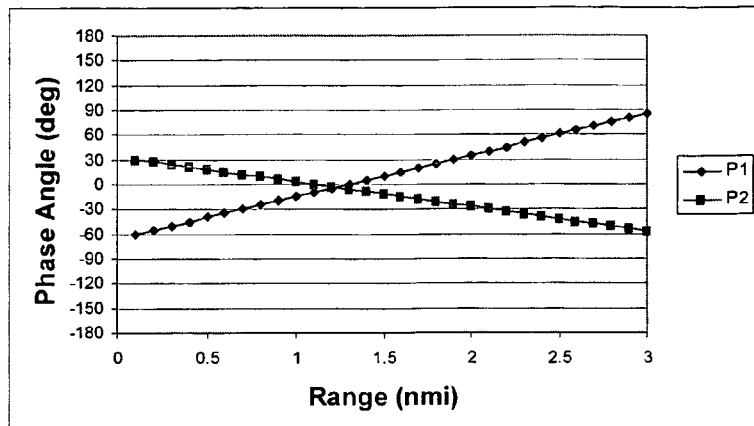
FIG. 10 is a graph showing trace P1 shown in FIG. 9 along with a trace of the phase of a second sample pulse with respect to range (P2)

In preferred embodiments of enhanced detection method 200, delay step 220 and comparison step 225 prepare the phase-range data for masking. Delay step 220 uses the phase-range data of the return pulse PRD $P_i$ and a trace of PRD $P_i$ is shown in FIG. 9 and labeled P1. At delay step 220, additional phase-range data is obtained, preferably by a one-pulse delay, for the next return pulse $P_{i+1}$. The phase-range data of the successive pulse is referenced herein as PRD $P_{i+1}$ and preferably comprises an array of phase data as a function of range data $[r_{i+1}, \Phi(r_{i+1})]$. Output of the one-pulse delay includes PRD $P_i$ and PRD $P_{i+1}$, each of which preferably include a phase-range array. Traces of PRD $P_i$ and PRD $P_{i+1}$ are shown in FIG. 10 and are labeled P1 and P2, respectively.

Figure 11A:
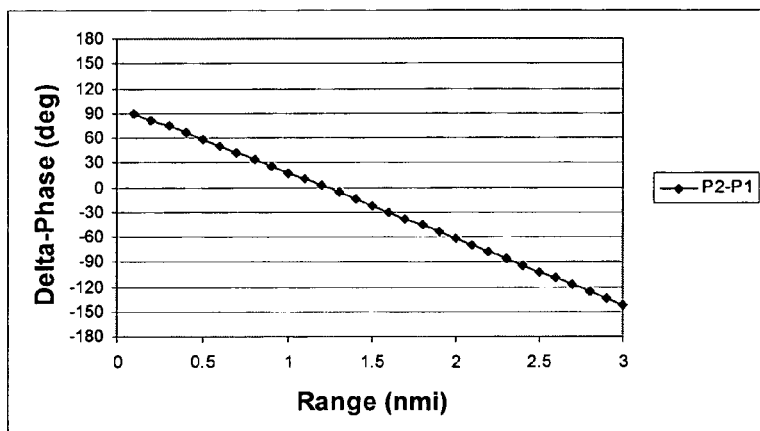
FIG. 11a is a graph showing a trace of the difference ΔP between the P1 trace shown in FIGS. 9 and 10 and the P2 trace shown in FIG. 10.
Figure 11B:
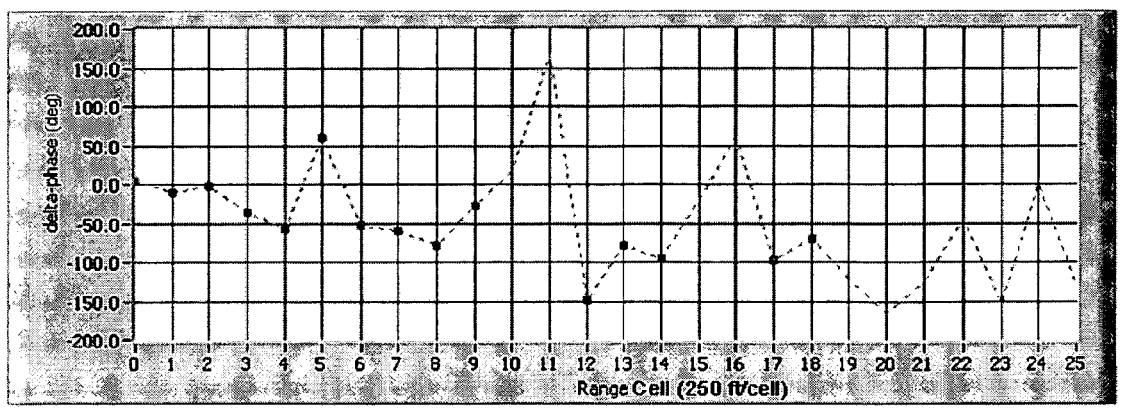
FIG. 11b is a display showing a sample trace of a sample difference ΔP between a sample P1 trace and a sample P2 trace.

At comparison step 225, the arrays of PRD $P_i$ and PRD $P_{i+1}$ are compared to yield the change in the phase information between the two arrays. This difference is referenced herein as PRD $\Delta P$ and preferably comprises an array of change in phase data as a function of range data $[r_i, \Delta\Phi(r_i)]$. Difference PRD $\Delta P$ is then passed to masking step 240, which will be further discussed below in detail after discussion of subset step 230 and mask building step 235. A trace of difference PRD $\Delta P$ is shown in FIG. 11a and a display is shown in FIG. 11b to include a sample trace of the difference $\Delta P$ between a sample P1 trace and a sample P2 trace. Although sample data rarely produces an ideal or linear trace, suitable methods are known in the art to account for deviations from the ideal.

Subset step 230 and mask building step 235 use amplitude-based information to prepare the mask. Subset step 230 uses the amplitude-range data of the return pulse ARD $P_i$. At subset step 230, a subset of ARD $P_i$ is created that contains coordinates that satisfy an amplitude threshold. In the preferred embodiment, only range coordinates for signals of sufficient amplitude are allowed to proceed along the signal and/or logic path for further processing. In this respect, the analysis of the phase-range data is, in preferred embodiments, limited to certain data points that have not been ruled-out as potentially noise limited. At mask building step 235, an amplitude mask is built from the subset created in subset step 230. The amplitude mask is preferably a function of range. Any suitable amplitude mask known in the art may be used.

Continuing with principal reference to FIG. 7, the amplitude mask is applied to the difference at masking step 240. The amplitude mask is used, at least in part, to control false alarms for the processed phase-range data. Some embodiments of enhanced detection method 200 do not require subset step 230, mask building step 235 and/or masking step 240; however, such steps are present in the preferred embodiment of enhanced detection method 200.

At differentiating step 245, the masked difference is differentiated with respect to range. The derivative is performed, at least in part, to aid in the target detection and discrimination process. An additional benefit of the derivative is that it resolves intra-pulse phase instabilities, which may be a consequence of oscillator drift in magnetron-based systems. It is contemplated that some embodiments of enhanced detection method 200 could use linear regression techniques and/or wavelet transforms in place of differentiating step 245.

Figure 12A:
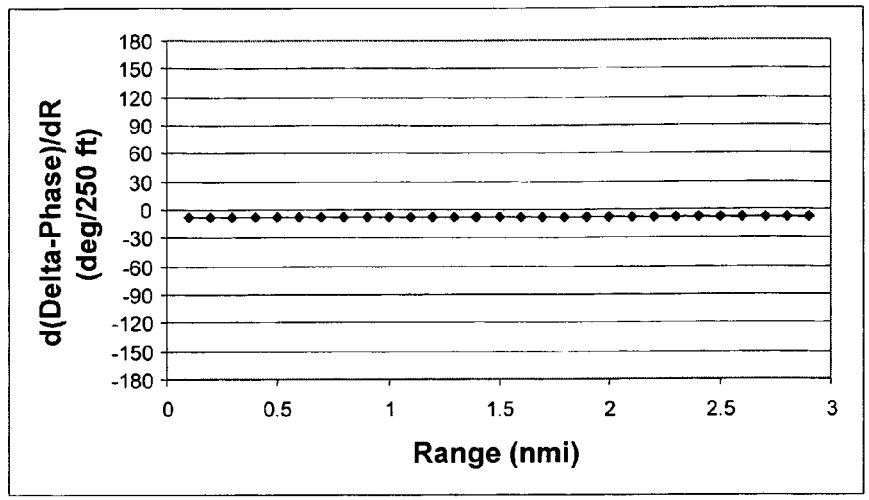
Figure 12B:
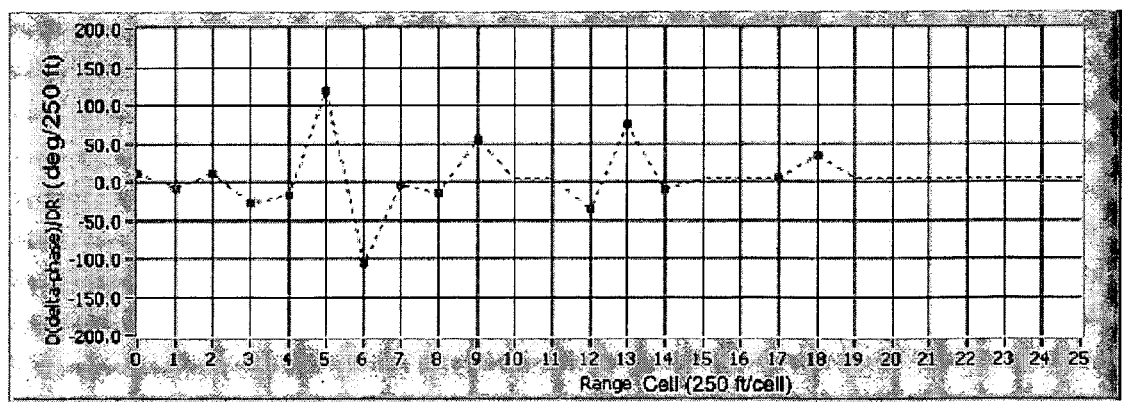
FIG. 12b is a display showing a sample trace of the derivative of the sample ΔP function of FIG. 11b.
Figure 13:
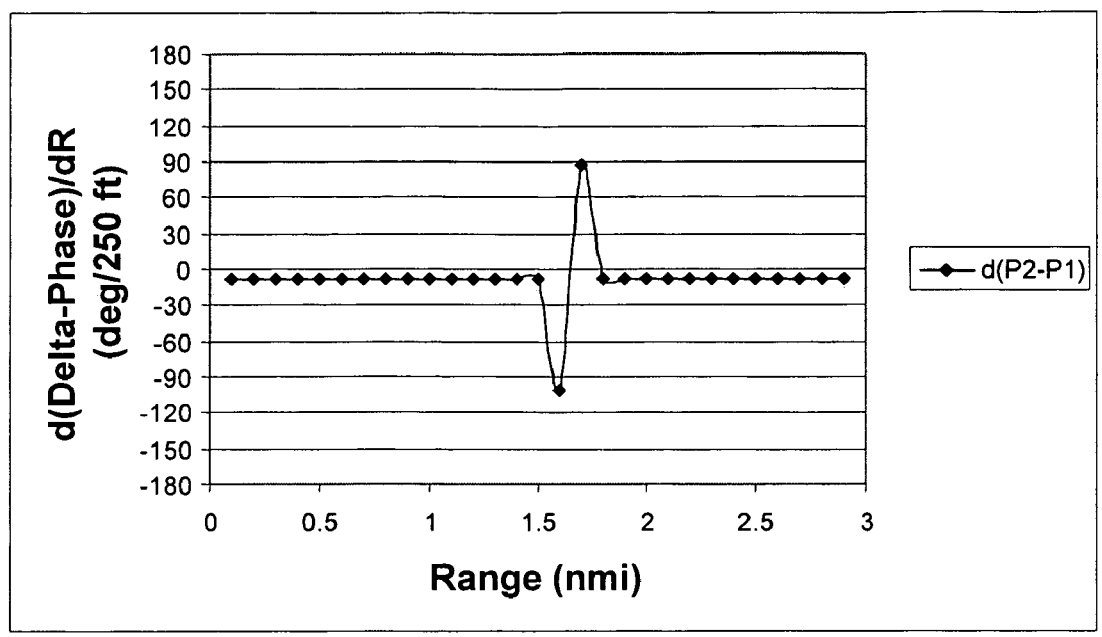
FIG. 13 is a graph showing the trace of FIG. 12a with a slope disturbance representative of a potential target.
Figure 14:
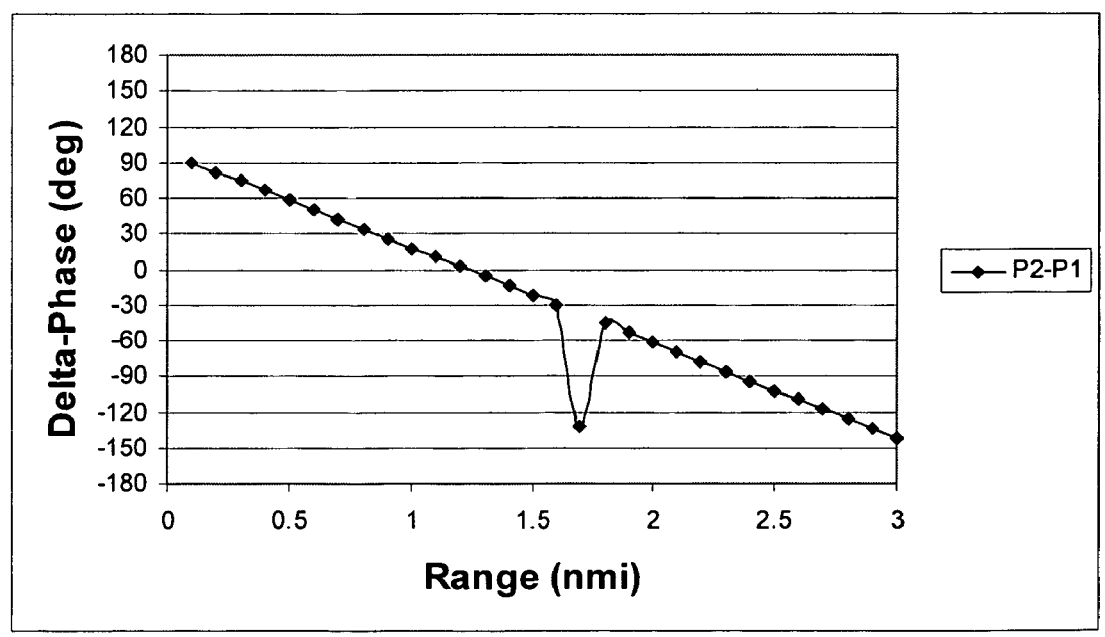
FIG. 14 is a graph showing the trace of FIG. 11a with a slope disturbance representative of a potential target.
Figure 15:
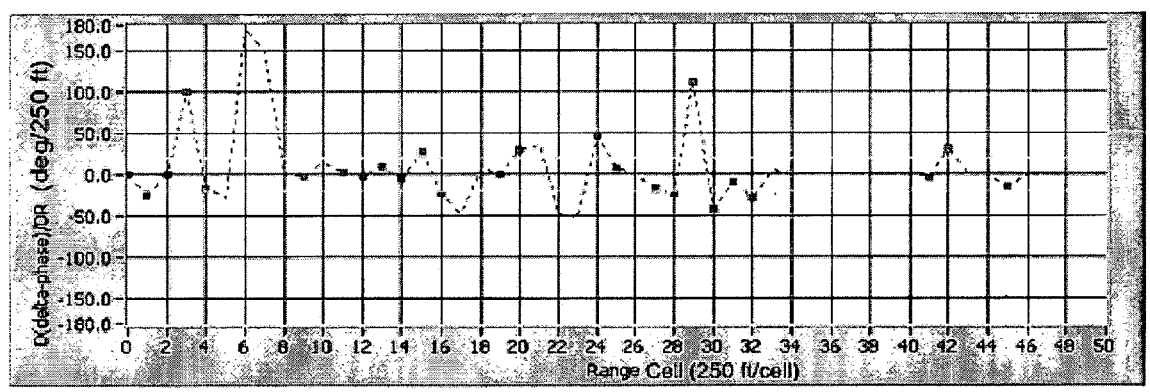
FIG. 15 is a display showing simple application of velocity threshold step to a derivative of a ΔP function.

At velocity threshold step 250, enhanced target detection is attempted by identifying coordinates in the derivative of the masked difference that satisfy a velocity threshold. Pulse-to-pulse phase difference may be used to calculate velocity. The derivative of the masked difference, also referenced herein as a "differentiated mask difference," is a measure of velocity as a function of range and a trace and sample trace are shown in FIGS. 12a and 12b, respectively, with no target present. In contrast thereto, FIG. 13 shows a slope disturbance in the differentiated masked difference. In this respect, the velocity threshold discriminates contacts that have velocity content differing from the clutter. As discussed, it is preferred, but not required, that the masked difference be differentiated. As shown in FIG. 14, a slope disturbance representative of a target is shown in a trace of a non-differentiated masked difference. The complexity and/or difficulty of the processing of velocity threshold step 250 are minimized if the differentiated masked difference is analyzed rather than the non-differentiated masked difference. The reduction in complexity may be observed by comparison of the graphs shown in FIGS. 13 and 14. FIG. 15 shows a sample trace that evidences the types of coordinates present in a differentiated masked difference for a simple velocity threshold (the horizontal trace demonstrates the simple velocity threshold). Velocity threshold step 250 will be discussed in further detail below with principal reference to FIG. 16.

Continuing with principal reference to FIG. 7, identification step 255 identifies whether a target has been detected by at least one of envelope detection step 215 and the method of steps 220-250. This permits identification of a target that satisfies either of envelope detection step 215 or velocity threshold step 250. When a target is distinguished due to enhanced detection, then the enhanced target data is displayed at display step 260. At loop step 265, "i" is incremented and the data on a successive pulse pair is studied (e.g. $PRD_{(i+1)}$ and $PRD_{(i+1)+1}$).

Figure 16:
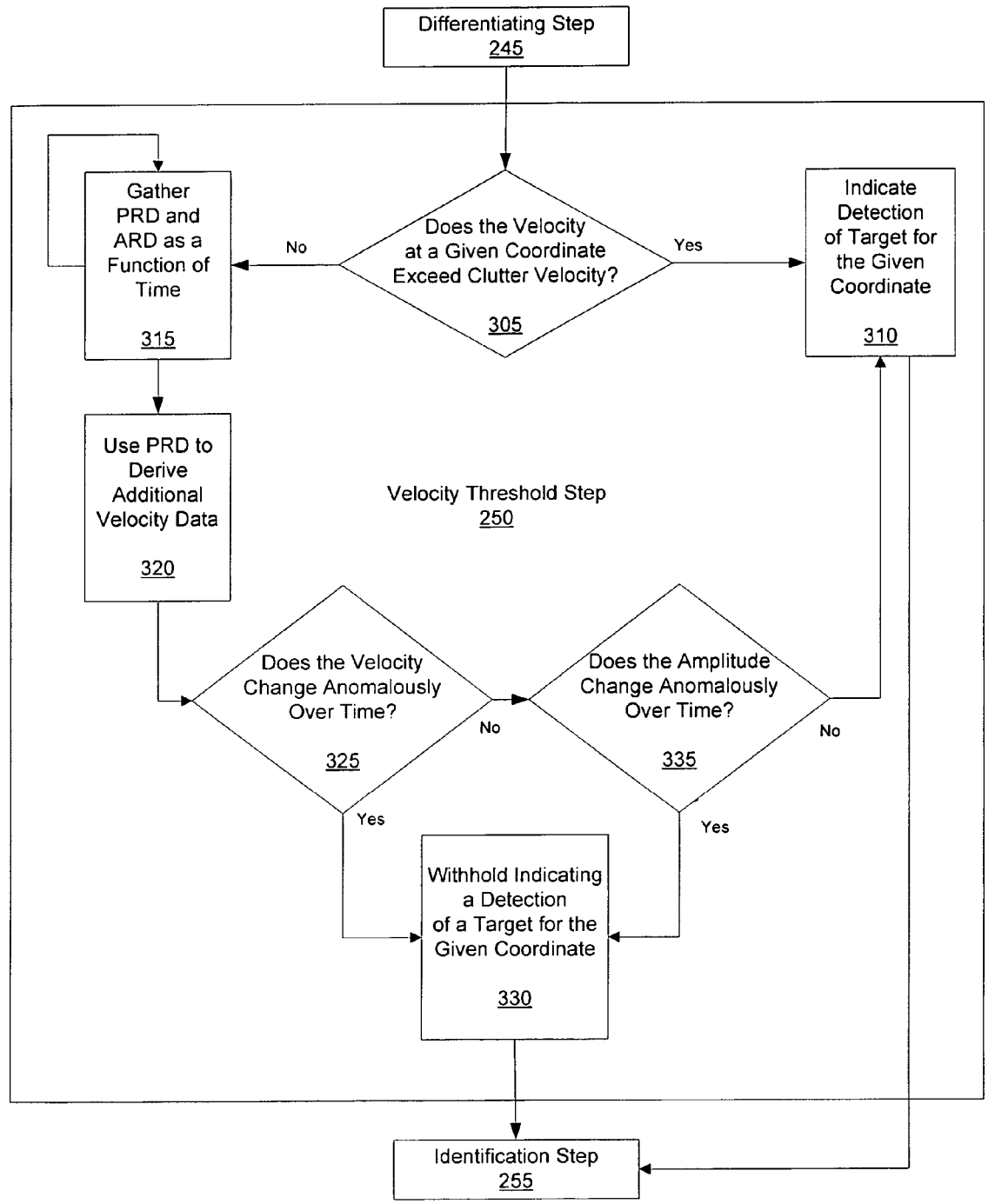
FIG. 16 is a flow chart showing a preferred embodiment of a velocity threshold step.

Velocity threshold step 250 will now be further discussed with principal reference to FIG. 16. In the event that the potential target is a relatively fast moving target, and particularly when the potential target moves much faster than clutter velocity, the target may be discriminated from the clutter by a simple comparison of the magnitude of the instantaneous velocity at a given coordinate against a magnitude that is equal to, or greater than, a chosen clutter velocity. This technique is particularly effective for detecting fast-moving targets.

However, should the target be a relatively slow-moving target, such as when the target moves at a velocity close to or below clutter velocity, then it is not preferable to make a simple comparison between the derivative of the masked difference and a clutter velocity. If, by way of example, clutter velocity is two knots, then a simple velocity threshold should suffice for detecting a potential target moving at four knots. However, in the case of a slow-moving target, such as a periscope moving at one and one-half knots, it becomes more difficult to discriminate the target from the clutter using a simple comparison of the derivative of the masked difference to a clutter velocity. In such a case, it is desirable to analyze more than a simple comparison of the differentiated masked difference to the clutter velocity or a simple comparison of the differentiated difference to the clutter velocity. This additional analysis and process will now be discussed further.

Clutter may be characterized as having certain clutter behavior. Clutter, such as sea clutter, terrain clutter, etc. has velocity signatures that may also be affected by external factors, such as radar frequency and wind conditions. For example, a statistical sampling of clutter at a given coordinate over time would reveal erratic changes of velocity and amplitude readings. These anomalous changes of velocity over time and/or anomalous changes of amplitude over time are preferably used by velocity threshold step 250 as another measure for filtering out clutter in the discrimination of the target from the clutter.

Continuing with principal reference to FIG. 16, velocity threshold step 250 preferably includes simple comparison step 305, target detection step 310, information gathering step 315, velocity derivation step 320, velocity analysis step 325, target non-detection step 330 and amplitude analysis step 335. At simple comparison step 305, the magnitude of the differentiated masked difference passed from differentiating step 245 is compared against the clutter velocity. In the event that the differentiated masked difference—or other value, such as a difference or differentiated difference, depending upon the embodiment—is associated with a velocity exceeding clutter velocity, then target detection step 310 indicates an instance of target detection to identification step 255. Note that the "clutter velocity" may be chosen to be the velocity of the clutter or it may be chosen to be a value slightly higher than the velocity of the clutter, depending upon the desired embodiment of the invention.

At information gathering step 315, PRD and ARD are gathered over time, preferably by obtaining information about successive pulses. At velocity derivation step 320, the additional PRD, and optionally the additional ARD, are used to derive additional velocity information. In preferred embodiments, "i" is incremented through a looping process analogous to that shown in FIG. 7 and the method of information gathering step 315 and velocity derivation step 320 are preferably analogous to the method performed by steps 220-245 or any sub-combination of steps 220-245. Those skilled in the art will appreciate that the data collection and analysis of the sub-steps of velocity threshold step 250 can be accomplished from the data collection and analysis of other steps shown in FIG. 7. For example, as $PRD_i$, $PRD_{i+1}$, ..., $PRD_n$ and $ARD_i$, $ARD_{i+1}$, ..., $ARD_n$ are collected and compared for use in other steps of FIG. 7, said data can be saved, at least temporarily, for use by information gathering step 315 and velocity derivation step 320.

At velocity analysis step 325, velocity information over time is studied to identify whether a potential target is statistically more likely to be clutter. For example, some clutter characteristically accelerates and decelerates over time, thus having a signature with sudden changes in velocity. Target non-detection step 330 filters-out coordinates associated with these velocity anomalies as being associated with the clutter. Target non-detection step 330 withholds passing an indication of target detection to identification step 255.

In the embodiment shown in FIG. 16, the amplitude data is analyzed at amplitude analysis step 335, if a velocity anomaly has not been detected at velocity analysis step 325. Clutter behavior, in addition to including signatures that have characteristically sudden drops in velocity, also includes signatures having characteristically sudden drops in amplitude. Target non-detection step 330 filters-out coordinates associated with these amplitude anomalies as being associated with the clutter. Target non-detection step 330 withholds passing an indication of target detection to identification step 255.

In the embodiment of velocity threshold 250 shown in FIG. 16, target detection step 310 indicates an instance of target detection to identification step 255 if the given coordinate is not associated with clutter behavior, such as anomalous velocity and/or anomalous amplitude.

Although an embodiment of velocity threshold step 250 is shown in FIG. 16 and discussed above to include all of steps 305-335, preferred embodiments of velocity threshold step 250 include any combination of the steps thereof. For example, some embodiments of velocity threshold step 250 principally utilize simple comparison step 305, while some embodiments of velocity threshold step 250 use most of steps 305-335 but omit velocity analysis step 325 or amplitude analysis step 335. Many embodiments of velocity threshold step 250 are contemplated that include combinations and/or sub-combinations of steps 305-335 and/or other steps. When a particular embodiment is used, may depend upon the type of target to be detected and/or the estimated velocity range of the target to be detected. In the case of detecting a target moving substantially faster than clutter velocity, a preferred embodiment of velocity threshold 250 might principally use simple comparison step 305 and forego the additional processing of velocity analysis step 325 or amplitude analysis step 335. In particular, amplitude analysis step 335 is simply another prophylactic measure for discrimination and may, in some embodiments, be omitted.

In testing certain embodiments of enhanced detection system 100, an auxiliary system was designed to improve the detection capabilities of commercial maritime radars (e.g. non-coherent, magnetron-based radar devices) for small maritime targets under sea-clutter-limited conditions. Testing included an embodiment of enhanced detection method 200. FIG. 2 shows results of testing against collected data. FIG. 2 displays eighty-five scans of data for a clutter-limited scene. Winds were about 10 knots. The x-axis is related to antenna azimuth, with upwind on the right side.

FIG. 3 shows that the track of a small target, such as a thirty-foot scarab, is clearly visible after passing phase-range data and amplitude-range data through an embodiment of enhanced detection system 100.

Tests were conducted using a commercial radar device. Specifically, the radar device used in the testing was a Sperry Bridgemaster E, referenced further herein as a Bridgemaster, with a twenty-five kilowatt magnetron. This non-coherent radar device is designed to detect targets using amplitude-only envelope detection. However, after non-invasive coupling of the Bridgemaster to an embodiment of enhanced detection system 100, positive test results were observed indicating coherence of the magnetron over successive pulses in real-time. In addition to the expected non-coherence of the magnetron, instabilities in the intra-pulse phase of the intermediate frequency signal of the Bridgemaster were also observed. However, test results also indicated successful real-time stabilization of the intra-pulse phase of the intermediate frequency signal.

Tests were conducted using a digital data recorder that was designed to start collection based on the trigger of a radar device and record a selectable number of samples at a selectable rate consistent with the pulse width and required range coverage. Using the Bridgemaster, the digital data recorder demonstrated collection of long-pulse data with two megahertz sampling (at two hundred and fifty foot range-gate spacing) and collection of short-pulse data with twenty-one megahertz sampling (at twenty-three foot range resolution). The typical range coverage was between about six nautical miles and twelve nautical miles. The digital data recorder was capable of collecting several hours of data to a bank of hard drives similar to a redundant array of independent disks (RAID).

The radial velocity for each of the backscattered return pulses/echoes from each range cell was estimated from the phase difference over successive pulses. The Bridgemaster frequency is nine-thousand-four-hundred-ten (9,410) megahertz and, in long-pulse mode, the Bridgemaster operates at seven-hundred-eighty-five (785) hertz pulse-repetition-frequency (PRF). This provides an ambiguous Doppler of 24.3 knots. When a phase difference is calculated for successive pulses, it is substantially equivalent to estimating radial velocity with a fifteen degree phase difference per knot. The radial-velocity information is useful for discriminating targets from the clutter.

As a nonlimiting example, for conditions typical of sea-state two to three, the mean sea clutter Doppler velocity for upwind observations is on the order of two knots with most of the radial velocities bounded between about zero and four knots. This corresponds to a phase difference of zero to sixty degrees, where positive phase differences may be treated as advancing velocities. Thus, any return pulses with phase differences outside these limits are treated as potential targets, because they behave differently than the ambient clutter. If the short-pulse mode is used, which operates at one-thousand-eight-hundred (1,800) hertz PRF on the Bridgemaster, there would be an ambiguous Doppler of 55.8 knots. When a phase difference is calculated for successive return pulses, it would be substantially equivalent to estimating radial velocity with a 6.5 degree phase difference per knot.

The Bridgemaster was positioned approximately one-half mile from the shoreline with the antenna at an altitude of approximately sixty (60) feet. Winds were about thirty knots with a solid sea-state of three. The target vessel was a thirty-foot scarab operating from shore out to approximately four miles. Embodiments of enhanced detection system 100 coupled to the Bridgemaster produced and showed enhanced levels of target detection on an embodiment of display 70.

In long pulse mode, the amount of time that the antenna of the Bridgemaster spent on each radial set of range cells before rotating to an adjacent radial set of range cells was approximately seven milliseconds, referenced as the "dwell time." During the seven millisecond dwell time, the Bridgemaster transmitted between four and five pulses at the approximate rate of 1.3 milliseconds per pulse. This provided approximately four to five opportunities to estimate radial velocity for each range sample. An M-of-N processing approach was employed for amplitude and phase returns within a dwell to control false alarms. In the tested embodiment of enhanced detection system 100, any returns outside the clutter radial-velocity range are preferably passed as potential targets. In preferred embodiments of enhanced detection system 100, performance improvement over standard envelope-detection processors can be achieved by allowing target identification as low as or even lower than a mean level of clutter amplitude.

It is contemplated that embodiments of enhanced detection system 100 may also be used to evaluate potential target radial-velocity estimates within a dwell as part of the target-identification process. Consistent velocity estimates within a dwell result in high-confidence target identifications, while association of potential targets with radial velocities consistent over two or more scans results in total-confidence identifications. It is contemplated that automatically-detected targets may be tagged with radial-velocity estimates after a single dwell.

It is also contemplated that short-pulse modes may be utilized for commercial and military radar systems to detect small targets, such as submarine periscopes. Short-pulse operation provides lower average radar sea clutter return, so on average, targets associated with lower radar cross sections should be detectable. Short-pulse sea clutter data takes on characteristics associated with spiky clutter and the sea clutter spikes associated with the wave crests behave like discrete targets concentrated in individual range cells. Radar range cells unoccupied by sea spikes contain predominantly receiver noise. Within these range cells, contemplated embodiments of enhanced detection system 100 may achieve considerable sub-clutter visibility and make confident target declarations below mean levels of sea clutter amplitude.

In long-pulse mode, the illuminated sea-surface area is large enough to permit multiple sea spikes to exist within a radar range sample. This gives rise to the notion that the clutter levels may be treated as being distributed. Interference between these multiple discrete scatterers may degrade the radial velocity estimate. However, in short-pulse mode, the reduced illumination area of the sea surface for each sample tends toward radar range cells that contain an individual sea-spike phenomenon, and radial-velocity estimation is based on a purer tone, corresponding to the phasor rotation, or Doppler, from an individual, discrete, scattering event, such as a wave crest.

Preferred embodiments of enhanced detection method 200 take advantage of the coherent behavior of backscatter from natural clutter phenomena in order to enhance detection of a target in clutter when using a non-coherent radar device. The phase delta $\Delta\Phi(r_i)$ from pairs of consecutive, non-coherent radar pulses contains radial velocity information for a target and for a statistically significant number of clutter elements lying along the target's radial. The radial-velocity information from the target can yield a detection when distinguishable from that of the clutter elements.

In preferred embodiments of enhanced detection method 200, the radial velocity information from a non-coherent radar device is corrected for phase instabilities from pulse-to-pulse and within a single pulse. Preferred embodiments of enhanced detection system 100 establish coherence using a coherent oscillator 30 that is independent of radar device 10. Preferred embodiments of coherent oscillator 30 are used primarily for downconversion of the intermediate frequency signal of radar device 10. Further, preferred embodiments of enhanced detection system 100 do not require that signals be sent to radar device 10 or that hardware be invasively installed therein in order for enhanced detection system 100 to establish coherence. Preferred embodiments of enhanced detection system 100 use clutter to establish coherence based on the backscattered return from range cells under surveillance.

What is claimed is:

1. A computer-readable medium having stored thereon computer-executable instructions for performing the following method:
   providing phase-range data associated with a return pulse of a radar device and second phase-range data associated with a successive return pulse of the radar device;
   comparing the phase-range data and the second phase-range data to obtain a difference;
   differentiating the difference; and
   discriminating a target from clutter by using the differentiated difference to identify coordinates satisfying a velocity threshold associated with the clutter.

2. The computer-readable medium of claim 1, wherein providing phase-range data and second phase-range data comprises providing an array of phase data as a function of range data and a second array of second phase data as a function of second range data.

3. The computer-readable medium of claim 1, wherein discriminating comprises discriminating the target from the clutter by using the differentiated difference to identify coordinates associated with a velocity exceeding clutter velocity.

4. The computer-readable medium of claim 1, wherein discriminating comprises:
   identifying clutter behavior; and
   filtering-out coordinates of the differentiated difference associated with the clutter behavior.

5. The computer-readable medium of claim 4, wherein identifying clutter behavior comprises at least one of identifying an anomalous change of velocity and identifying an anomalous change of amplitude.

6. The computer-readable medium of claim 1, wherein providing comprises providing phase-range data associated with a return pulse of one of a plurality of radar devices and second phase-range data associated with a successive return pulse of the one of the plurality of radar devices.

7. The computer-readable medium of claim 1, further comprising computer-executable instructions for extracting the phase-range data and second phase-range data from an in-phase signal and a quadrature signal taken from an intermediate frequency signal of a radar device.

8. A computer-readable medium having stored thereon computer-executable instructions for performing the following method:
   providing phase-range data associated with a return pulse of a radar device, second phase-range data associated with a successive return pulse of the radar device, and amplitude-range data associated with at least one of the return pulse and the successive return pulse;
   comparing the phase-range data and the second phase-range data to obtain a difference;
   creating a subset of coordinates from the amplitude-range data that satisfy an amplitude threshold associated with the clutter;
   building an amplitude mask from the subset;
   applying the amplitude mask to the difference;
   differentiating the masked difference; and
   discriminating a target from clutter by identifying coordinates from the differentiated masked difference satisfying a velocity threshold associated with the clutter.

9. The computer-readable medium of claim 8, wherein discriminating comprises discriminating the target from the clutter by using the differentiated difference to identify coordinates associated with a velocity exceeding clutter velocity.

10. The computer-readable medium of claim 8, wherein discriminating comprises:
    identifying clutter behavior; and
    filtering-out coordinates of the differentiated masked difference associated with the clutter behavior.

11. The computer-readable medium of claim 10, wherein identifying clutter behavior comprises at least one of identifying an anomalous change of velocity and identifying an anomalous change of amplitude.

12. A system for discrimination of a target from clutter, the system comprising:
    a computer-readable medium having stored thereon computer-executable instructions for performing the following method:
      providing phase-range data associated with a return pulse of a radar device and second phase-range data associated with a successive return pulse of the radar device;
      comparing the phase-range data and the second phase-range data to obtain a difference;
      differentiating the difference; and
      discriminating the target from the clutter by using the differentiated difference to identify coordinates satisfying a velocity threshold associated with the clutter; and
    at least one computing device for executing the computer-executable instructions stored on the computer-readable medium.

13. The system of claim 12, wherein the at least one computing device comprises at least one processor and an at least temporary memory.

14. The system of claim 12, further comprising:
    means for non-invasively acquiring an intermediate frequency signal of the radar device; and
    means for downconversion of the intermediate frequency signal to an in-phase signal and a quadrature signal associated with the phase-range data and the second phase-range data.

15. The system of claim 14, wherein the means for downconversion comprises:
    a coherent oscillator for generating a coherent oscillator signal; and
    a mixer for mixing the intermediate frequency signal and the coherent oscillator signal.

16. The system of claim 14, wherein the system is substantially free of a coherent radar device.

17. The system of claim 14, further comprising the radar device, and wherein the radar device is in electrical communication with the means for downconversion.

18. The system of claim 17, wherein the radar device comprises a non-coherent radar device in electrical communication with the means for downconversion.

19. The system of claim 14, comprising a display for showing the discriminated target substantially free of clutter.

20. The system of claim 19, wherein the system is substantially free of a coherent radar device.

21. The system of claim 12, wherein the target comprises at least a portion of a watercraft.

22. The system of claim 12, wherein the target comprises a submarine periscope.

23. The system of claim 12, wherein the target comprises at least one of a human and a land vehicle.

24. The system of claim 12, wherein the clutter comprises sea clutter.

25. The system of claim 12, wherein the clutter comprises at least one of terrain clutter, rain clutter, and discrete clutter.

26. A method for discrimination of a target from clutter, comprising:
  providing phase-range data associated with a return pulse of a radar device, second phase-range data associated with a successive return pulse of the radar device, and amplitude-range data associated with at least one of the return pulse and the successive return pulse;
  comparing the phase-range data and the second phase-range data to obtain a difference;
  creating a subset of coordinates from the amplitude-range data that satisfy an amplitude threshold associated with the clutter;
  building an amplitude mask from the subset;
  applying the amplitude mask to the difference;
  differentiating the masked difference; and
  discriminating the target from the clutter by identifying coordinates from the differentiated masked difference satisfying a velocity threshold associated with the clutter.

27. The method of claim 26, further comprising deriving the phase-range data, the second phase-range data and the amplitude-range data from an in-phase signal and a quadrature signal associated with an intermediate frequency signal of the radar device.

28. The method of claim 27, further comprising downconverting the intermediate frequency signal with a coherent oscillator signal to produce the in-phase signal and the quadrature signal.

29. The method of claim 28, wherein downconverting comprises downconverting to produce the in-phase signal and the quadrature signal in an analog format, and wherein the method further comprises converting the in-phase signal and the quadrature signal from the an analog format into a digital format.

30. The method of claim 28, further comprising non-invasively acquiring the intermediate frequency signal from the radar device.

31. The method of claim 30, wherein non-invasively acquiring comprises non-invasively acquiring the intermediate frequency signal from a non-coherent radar device.

32. The method of claim 26, further comprising displaying the discriminated target substantially free of clutter.

33. The method of claim 26, wherein discriminating comprises discriminating the target from the clutter by using the differentiated masked difference to identify coordinates associated with a velocity exceeding clutter velocity.

34. The method claim 26, wherein discriminating comprises:
  identifying clutter behavior; and
  filtering-out coordinates of the differentiated masked difference associated with the clutter behavior.

35. The method of claim 34, wherein identifying clutter behavior comprises at least one of identifying an anomalous change of velocity and identifying an anomalous change of amplitude.

36. A method for discrimination of a target from clutter using an intermediate frequency signal of a non-coherent radar device, comprising:
  acquiring the intermediate frequency signal from the non-coherent radar device;
  manipulating the intermediate frequency signal to provide phase-range data associated with a return pulse of the non-coherent radar device and second phase-range data associated with a successive return pulse of the non-coherent radar device;
  comparing the phase-range data and the second phase-range data to obtain a difference;
  differentiating the difference; and
  identifying at least one disturbance in a slope of the differentiated difference satisfying a velocity threshold.

37. A method for discrimination of a target from clutter using an intermediate frequency signal of a non-coherent radar device, comprising:
  acquiring the intermediate frequency signal from the non-coherent radar device;
  manipulating the intermediate frequency signal to provide phase-range data associated with a return pulse of the non-coherent radar device and second phase-range data associated with a successive return pulse of the non-coherent radar device;
  comparing the phase-range data and the second phase-range data to obtain a difference;
  manipulating the intermediate frequency signal to provide amplitude-range data associated with at least one of the return pulse and the successive return pulse;
  building an amplitude mask from at least a portion of the amplitude-range data;
  applying the amplitude mask to the difference;
  differentiating the masked difference; and
  identifying at least one disturbance in a slope of the differentiated masked difference satisfying a velocity threshold.

38. The method of claim 37, further comprising displaying coordinates of the at least one disturbance in the slope that satisfy the velocity threshold.

39. The method of claim 37, further comprising creating a subset of coordinates from the amplitude-range data that satisfy an amplitude threshold, and wherein building comprises building the amplitude mask from the subset.

40. A method for substantial removal of relative phase variations from a non-coherent radar device to discriminate a target from clutter, comprising:
  non-invasively acquiring an intermediate frequency signal from the radar device;
  downconverting the intermediate frequency signal with a coherent oscillator signal to produce an in-phase signal having an analog format and quadrature signal having an analog format;
  converting the analog format of the in-phase signal and quadrature signal into a digital format;
  using the in-phase signal and quadrature signal to provide phase-range data associated with a return pulse of the radar device, second phase-range data associated with a successive return pulse of the radar device, and amplitude-range data associated with at least one of the return pulse and the successive return pulse;

comparing the phase-range data and the second phase-range data to obtain a difference;
creating a subset of coordinates from the amplitude-range data that satisfy an amplitude threshold associated with the clutter;
building an amplitude mask from the subset;
applying the amplitude mask to the difference;
differentiating the masked difference; and
discriminating the target from the clutter by identifying coordinates from the differentiated masked difference satisfying a velocity threshold associated with the clutter.

41. A method of non-invasively cohering a non-coherent radar device, comprising:
acquiring an intermediate frequency signal from the non-coherent radar device;
manipulating the intermediate frequency signal to provide phase-range data associated with a return pulse of the non-coherent radar device and second phase-range data associated with a successive return pulse of the non-coherent radar device;
manipulating the intermediate frequency signal to provide amplitude-range data associated with at least one of the return pulse and the successive return pulse;
comparing the phase-range data and the second phase-range data to obtain a difference:
building an amplitude mask from at least a portion of the amplitude-range data;
applying the amplitude mask to the difference to obtain a masked difference; and
differentiating the masked difference.

42. The method of claim 41, further comprising creating a subset of coordinates from the amplitude-range data that satisfy an amplitude threshold, and wherein building comprises building the amplitude mask from the subset.

43. A method of non-invasively cohering a non-coherent radar device, comprising:
acquiring an intermediate frequency signal from the non-coherent radar device;
manipulating the intermediate frequency signal to provide phase-range data associated with a return pulse of the non-coherent radar device and second phase-range data associated with a successive return pulse of the non-coherent radar device;
comparing the phase-range data and the second phase-range data to obtain a difference; and
differentiating the difference.

44. An enhanced detection system, comprising:
a coherent oscillator for generating a coherent oscillator signal;
a mixer for mixing the coherent oscillator signal and an intermediate frequency signal of a non-coherent radar device to downconvert the intermediate frequency signal to an in-phase signal and a quadrature signal in an analog format;
an analog-to-digital converter for converting the analog format of the in-phase signal and quadrature signal into a digital format;
a digital signal processor for receiving the in-phase signal and quadrature signal in the digital format and providing phase-range data of a return pulse of the non-coherent radar device and second phase-range data of a successive return pulse of the non-coherent radar device;
a computing device for comparing the phase-range data and the second phase-range data to obtain a difference, differentiating the difference, and discriminating a target from clutter by using the differentiated difference to identify coordinates satisfying a velocity threshold associated with the clutter; and
a display for showing the discriminated target substantially free of clutter.

45. The system of claim 44, further comprising the non-coherent radar device.

* * * * *